(12) United States Patent
Claerbout et al.

(10) Patent No.: US 10,419,836 B2
(45) Date of Patent: Sep. 17, 2019

(54) COMBINATION OF A LOUDSPEAKER HOUSING AND A SUSPENSION BRACKET

(71) Applicant: APART AUDIO, naamloze vennootschap, Schoten (BE)

(72) Inventors: Koen Jan Claerbout, Drongen (BE); Tom Jozef Maria Gheysens, Schilde (BE); Wim Corten, Hulst (BE)

(73) Assignee: APART AUDIO, NAAMLOZE VENNOOTSCHAP, Schoten (BE)

( * ) Notice: Subject to any disclaimer, the term of this patent is extended or adjusted under 35 U.S.C. 154(b) by 142 days.

(21) Appl. No.: 15/641,722

(22) Filed: Jul. 5, 2017

(65) Prior Publication Data

US 2019/0014400 A1    Jan. 10, 2019

(51) Int. Cl.
*H04R 1/02* (2006.01)
*H04R 3/00* (2006.01)
*G06F 3/16* (2006.01)

(52) U.S. Cl.
CPC ............. *H04R 1/023* (2013.01); *G06F 3/165* (2013.01); *H04R 3/00* (2013.01); *H04R 2201/021* (2013.01); *H04R 2201/025* (2013.01)

(58) Field of Classification Search
CPC ........... H04R 1/02; H04R 1/025; H04R 1/026
USPC ........................................ 381/386–390, 395
See application file for complete search history.

(56) References Cited

U.S. PATENT DOCUMENTS

| | | | | |
|---|---|---|---|---|
| 3,911,221 A | * | 10/1975 | Wong | F16C 11/0619 381/386 |
| 4,306,121 A | * | 12/1981 | Joscelyn | H04R 9/063 381/386 |
| 4,630,303 A | * | 12/1986 | Tanno | B60R 11/0217 181/145 |
| 4,953,223 A | * | 8/1990 | Householder | F16M 11/24 381/182 |
| 4,984,278 A | * | 1/1991 | Frye | H04R 1/30 248/179.1 |
| 7,077,236 B2 | * | 7/2006 | Sleboda | H04R 1/025 181/150 |
| 7,532,735 B2 | * | 5/2009 | Whitehouse | H04R 1/026 381/386 |
| 7,593,536 B2 | * | 9/2009 | Sung | G03B 31/00 381/312 |
| 8,189,849 B2 | * | 5/2012 | Waddell | H04R 1/02 181/198 |
| 8,311,262 B2 | * | 11/2012 | Kulchy | F16M 11/08 181/150 |

* cited by examiner

*Primary Examiner* — Suhan Ni
(74) *Attorney, Agent, or Firm* — Young & Thompson

(57) ABSTRACT

A combination of a loudspeaker housing and a suspension bracket for hanging the loudspeaker to a fixed suspension point, whereby the suspension bracket and the loudspeaker housing are provided with complementary mechanical coupling devices and whereby the suspension bracket and the loudspeaker are provided with complementary electrical contact points that are arranged to make contact with one another in the situation in which the loudspeaker housing and the suspension bracket are mechanically coupled by means of the mechanical coupling devices, and are further provided with means to fix the loudspeaker in a desired position with respect to the suspension bracket.

15 Claims, 7 Drawing Sheets

COMBINATION OF A LOUDSPEAKER HOUSING AND A SUSPENSION BRACKET

FIELD OF THE INVENTION

The present invention relates to a combination of a loudspeaker housing and a suspension bracket for hanging up such a loudspeaker housing.

BACKGROUND OF THE INVENTION

More specifically the invention is intended for making the hanging of a loudspeaker housing on a wall easier, faster, more efficient and more stable.

DESCRIPTION OF THE RELATED ART

When hanging up known loudspeaker housings by means of known suspension brackets a number of problems arise.

A problem is that both a mechanical and an electrical connection must be made. If the mechanical connection is made first, it is difficult and time consuming to make the electrical connection on account of the limited space at the back because the installer then largely or completely must proceed by feel.

If an electrical connection is made first, this presents the problem of a wire that is inevitably too long, which must be covered or concealed in in another way. Moreover, the installer must make the electrical connection at a height close to the suspension bracket, while the installer must hold the loudspeaker housing at the same time. It goes without saying that this is difficult, and it is also not without risk, because the installer then does not have a free hand to secure himself.

Loudspeaker housings for use in public spaces are normally provided with an adjustment button to adjust the power and/or other electrical characteristics, such that they can be adjusted to the desired sound level and the rest of the audio installation.

However, it is undesirable that people other than the installer can do this, because they could thereby cause damage or set the volume too high or too low.

A traditional suspension of a loudspeaker housing comprises a fixed bracket, with limited adjustment possibilities, or a ball and socket joint with unlimited adjustment possibilities. However, such ball and socket joints can lead to a change in the orientation of the loudspeaker housing in the long term due to vibrations or temperature fluctuations.

In particular it is undesirable that a loudspeaker housing hangs obliquely, i.e. seen from the front the intended vertical axis of the loudspeaker housing is not actually vertical.

SUMMARY OF THE INVENTION

The purpose of the present invention is to provide a solution to the aforementioned and other disadvantages, and to this end it concerns a combination of a loudspeaker housing and a suspension bracket for hanging the loudspeaker housing on a wall or other fixed suspension point, whereby the suspension bracket is provided with a first mechanical coupling device, whereby the loudspeaker housing is provided with a second mechanical coupling device, whereby the first mechanical coupling device is complementary to the second mechanical coupling device, whereby the suspension bracket is provided with at least two first electrical contact points that are at a fixed position and in a fixed orientation with respect to the first mechanical coupling device, and preferably on or at the first mechanical coupling device, whereby the loudspeaker housing is provided with at least two second electrical contact points that are located at a fixed position and in a fixed orientation with respect to the second mechanical coupling device, and preferably on or at the first mechanical coupling device, whereby the first electrical contact points are complementary to the second electrical contact points, whereby the first and second electrical contact points are arranged to make contact with one another in the situation in which the loudspeaker housing and the suspension bracket are mechanically coupled by means of the mechanical coupling devices.

For clarity it is noted that the first and second electrical contact points cannot be in direct contact in a situation in which the loudspeaker housing and the suspension bracket are not mechanically coupled, and that the second electrical contact points in the loudspeaker housing are electrically connected to loudspeakers in the loudspeaker housing.

As a result of this invention an electrical connection is automatically made, simultaneously with the mechanical coupling, due to the contact of the electrical contact points.

As a result, first a supply cable can be connected to the bracket comfortably, easily and safely without an unnecessary visible length, after which the necessary electrical connection can be brought into being without further specific action, due to the mechanical fastening of the loudspeaker housing to the suspension bracket.

In a preferred embodiment one of the mechanical coupling devices is a sheet-form coupling device and the other mechanical coupling device comprises a cutaway with an undercut part, whereby the sheet-form coupling device fits in the opening, and in the coupled situation of the mechanical coupling device is at least partially located in the undercut part.

As a result the coupling devices are better coupled.

In another preferred embodiment, at least one of the mechanical coupling devices comprises a latch that is held in an extended position by means of a spring, whereby the latch is placed such that it blocks the mechanical coupling devices with respect to one another, in a situation in which the loudspeaker housing and the suspension bracket are mechanically coupled.

This leads to a coupling that cannot be undone accidentally. The latch can be arranged to only be able to be unlatched with specific tools, in order to prevent the loudspeaker housing from being able to be taken from the suspension bracket by unauthorised persons.

In a further preferred embodiment the mechanical coupling devices are arranged such that the loudspeaker housing and the suspension bracket can be mechanically coupled in two or more different orientations with respect to one another.

In these two or more different orientations a direct contact is of course made between the first and second electrical contact points, by means of the location and the number of the first and/or second electrical contact points.

This has the advantage that the loudspeaker housing can be used in different orientations, for example with its longest axis horizontal or with its longest axis vertical.

A way in which this can be obtained is by the shape of the sheet-form coupling device and the undercut cutaway being square, or square with bevelled or rounded corners.

In another preferred embodiment the loudspeaker housing is provided with an adjustment button to adjust the electrical characteristics thereof, whereby the adjustment button is located in such a position that it is accessible in a situation in which the loudspeaker housing and the suspension bracket are not coupled and is not accessible in a situation in which the loudspeaker housing and the suspension brackets are mechanically coupled. This can easily be obtained by positioning the adjustment button such that it is covered by the first mechanical coupling device.

In a further preferred embodiment the first or second electrical contact points are formed by electrically conductive, preferably metal, pins, whereby the other electrical contact points are sunk in the holes in order to receive the pins.

In this way a reliable electrical connection is obtained.

Because loudspeaker systems can have a supply voltage of 100V there is an inherent risk of electric shocks during the installation.

Hence, preferably the second electrical contact points are formed by protruding electrically conductive, preferably metal, pins whereby the first electrical contact points are in holes in the coupling device of the suspension bracket.

In this way the first electrical contact points, that are supplied by an electrical source signal for audio, cannot be accidentally touched by the installer because they do not protrude, including in a non-coupled situation of the combination.

In a further preferred embodiment there are at least two sets of two electrical contact points from the electrical contact points that are sunk in the said holes, whereby each set is arranged separately to make contact with the other electrical contact points in a situation in which the loudspeaker housing and the suspension bracket are mechanically coupled, whereby a first set of the at least two sets is arranged to make contact with the other electrical contact points in a first orientation of the loudspeaker housing, and a second set of the at least two sets is arranged to make contact with the other electrical contact points in a second orientation of the loudspeaker housing.

In this way an electrical source signal for audio can easily be conveyed from the suspension bracket to the loudspeaker housing in the different orientations of the loudspeaker housing.

In a further preferred embodiment the suspension bracket is provided with a base for fastening the suspension bracket to a wall or other fixed suspension point, whereby the suspension bracket is provided with a hinge to be able to adjust the orientation of the first mechanical coupling device with respect to the base, whereby the hinge has two geometric hinge axes, i.e. a first geometric hinge axis and a second geometric hinge axis that is perpendicular to the first geometric hinge axis, whereby the hinge comprises a connecting element that is rotatable around both geometric hinge axis and which is deformable, whereby the connecting element is suspended at the base in a tightenable claw, whereby the connecting element is mounted around a physical pin that forms part of the first mechanical coupling device, whereby the claw is tightenable against the connecting element to thereby block a movement of the claw with respect to the connecting element and thereby to deform the connecting element so that it is pushed against the said physical pin to thereby block a movement of the said physical pin with respect to the connecting element.

In this way a rotation around two different geometric hinge pins can be blocked with one tightening action.

Preferably the claw can be tightened by means of a clamp, with a tightening shaft, whereby the tightening shaft is freely rotatable.

As a result the clamp can be operated from both the left and right, depending on what is the most practical in a specific situation.

If the combination is suspended this is preferably done with one of the said hinge pins vertical, whereby this hinge pin is closer to the suspension point than the other hinge pin.

As a result it is not possible for the loudspeaker housing to be suspended obliquely, while this undesirable situation is indeed possible in the reverse situation, thus with the horizontal hinge closest to the suspension point.

BRIEF DESCRIPTION OF THE DRAWINGS

With the intention of better showing the characteristics of the invention, a preferred embodiment of a combination according to the invention is described hereinafter, by way of an example without any limiting nature, with reference to the accompanying drawings, wherein:

FIG. 3 shows another part of the combination of FIG. 1 on a larger scale;

DETAILED DESCRIPTION OF THE INVENTION

Figure 1:
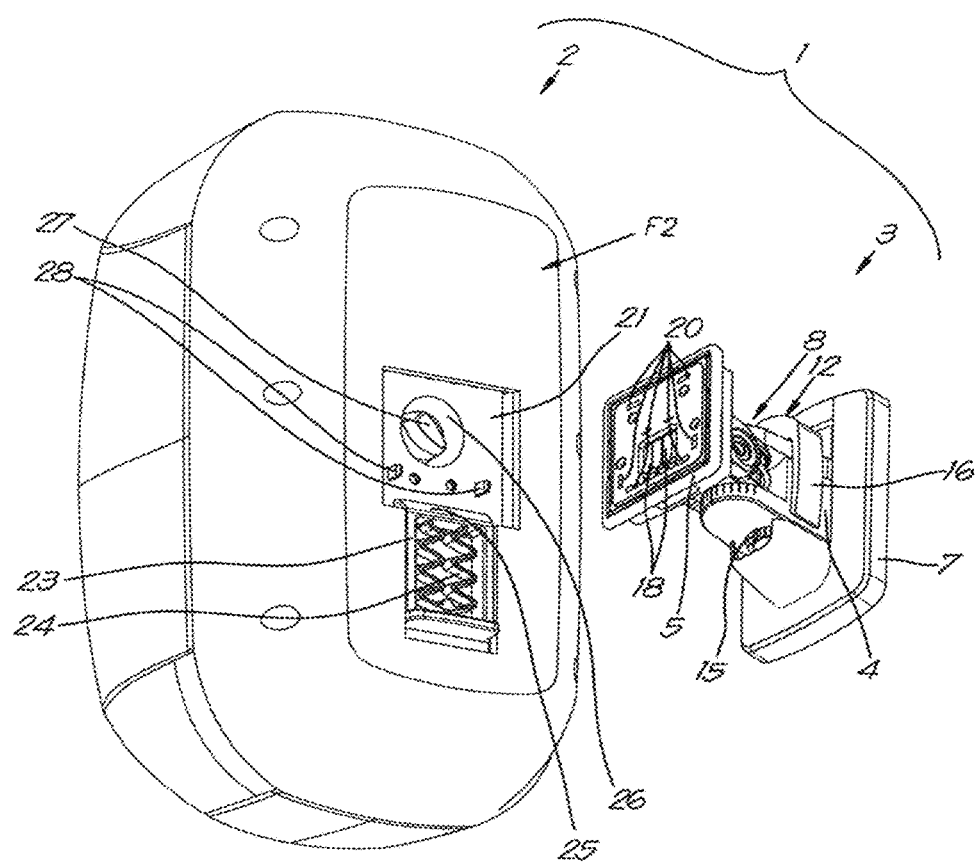
FIG. 1 schematically shows a perspective view of a combination according to the invention.
Figure 2:
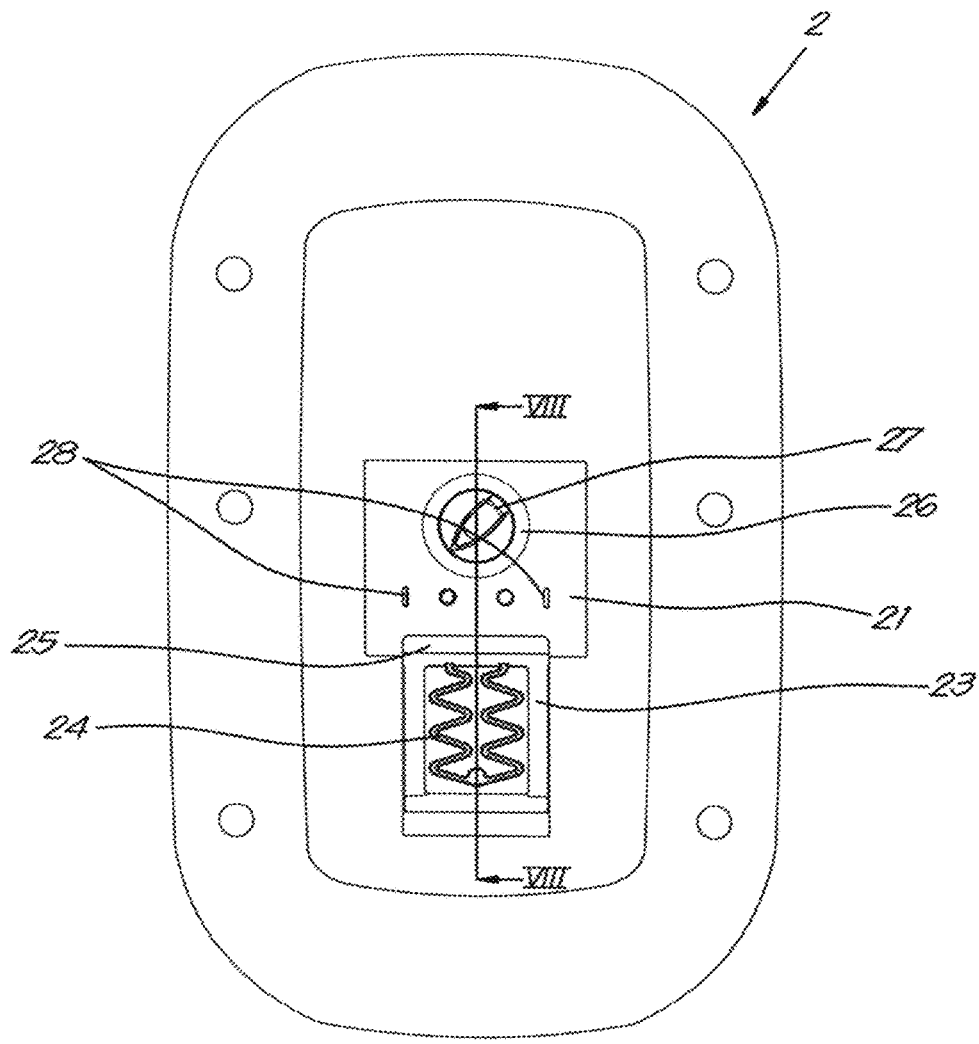
FIG. 2 shows a part of the combination of FIG. 1 in a view according to F2.
Figure 5:
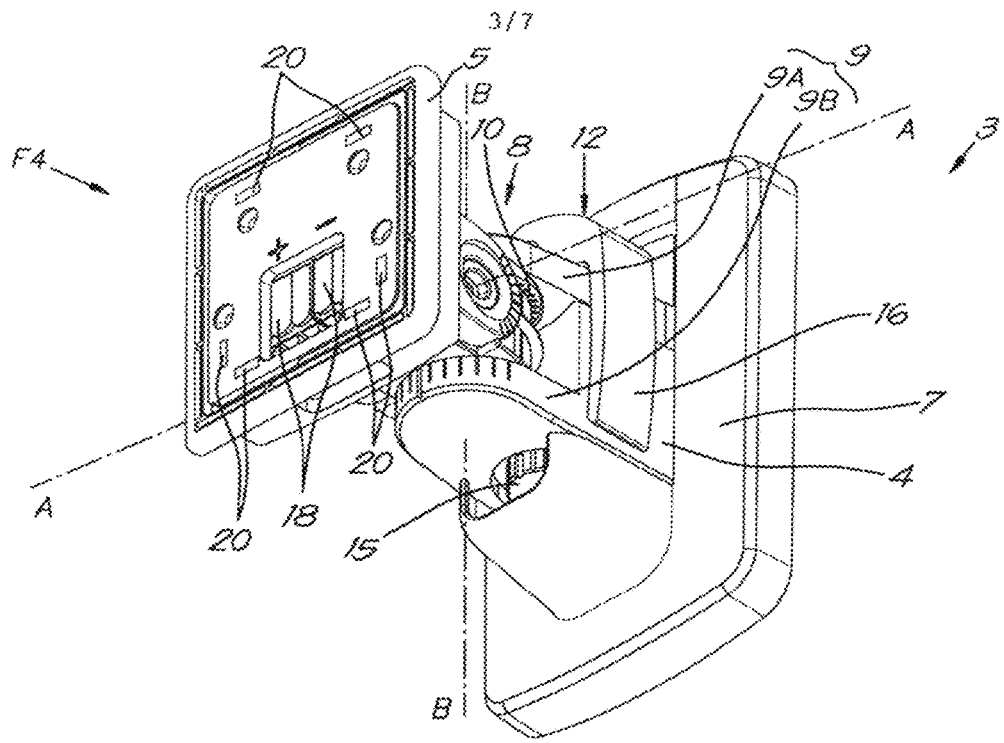
FIG. 5 shows a cross-section according to V-V of the part of FIG. 2.
Figure 4:
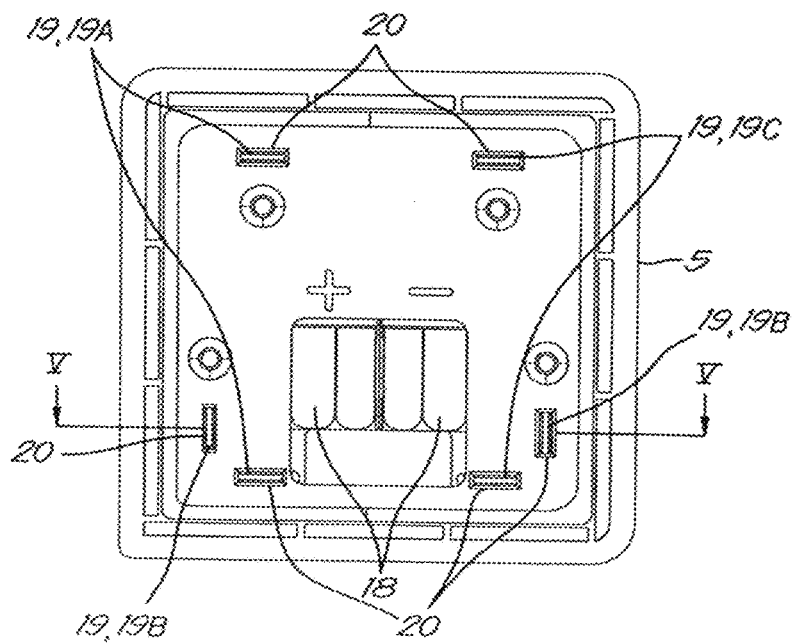
FIG. 4 shows a view according to F4 of a part of the component of FIG. 3.
Figure 5:
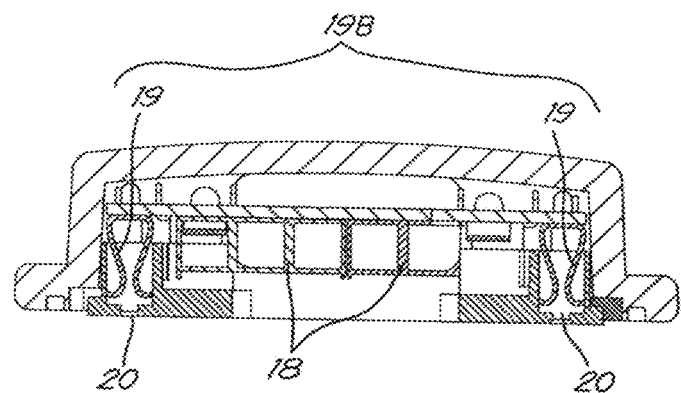
Figure 6:
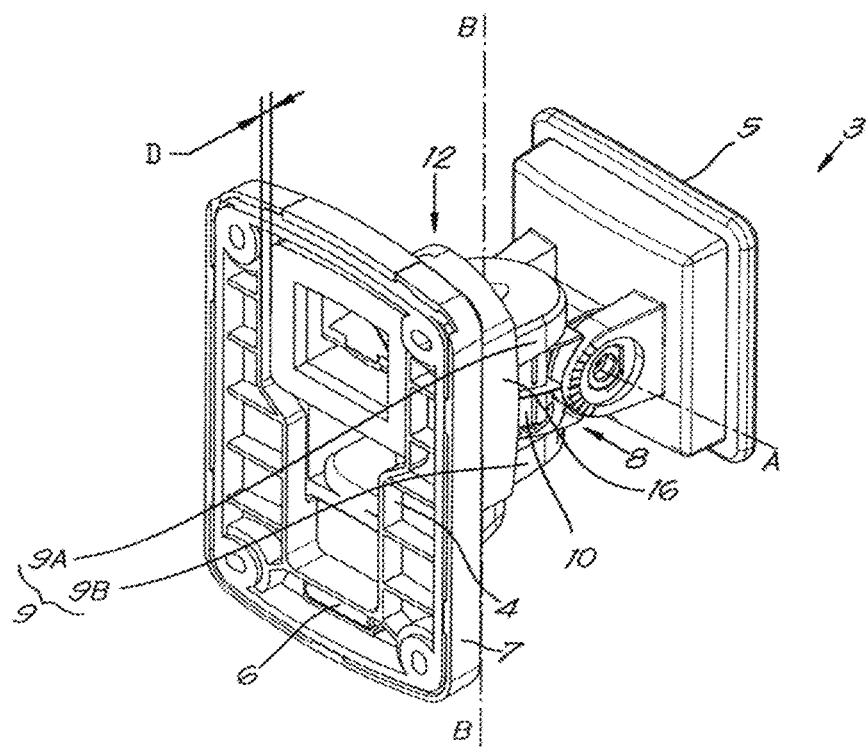
FIG. 6 shows the part of FIG. 4 from a different view.

The combination 1 shown in the drawings consists of a loudspeaker housing 2 and a suspension bracket 3.

The suspension bracket 3 is provided with a base 4 to mount the suspension bracket 3 against a wall or similar, and with a first mechanical coupling device 5, which in this example is constructed as an essentially sheet-form coupling device that is square with rounded corners.

The base 4 is provided with a spirit level 6 that is not visible in the mounted state because it is covered by a cover 7.

The first mechanical coupling device 5 and the base 4 are hingeable with respect to one another by means of a hinge 8.

Figure 7:
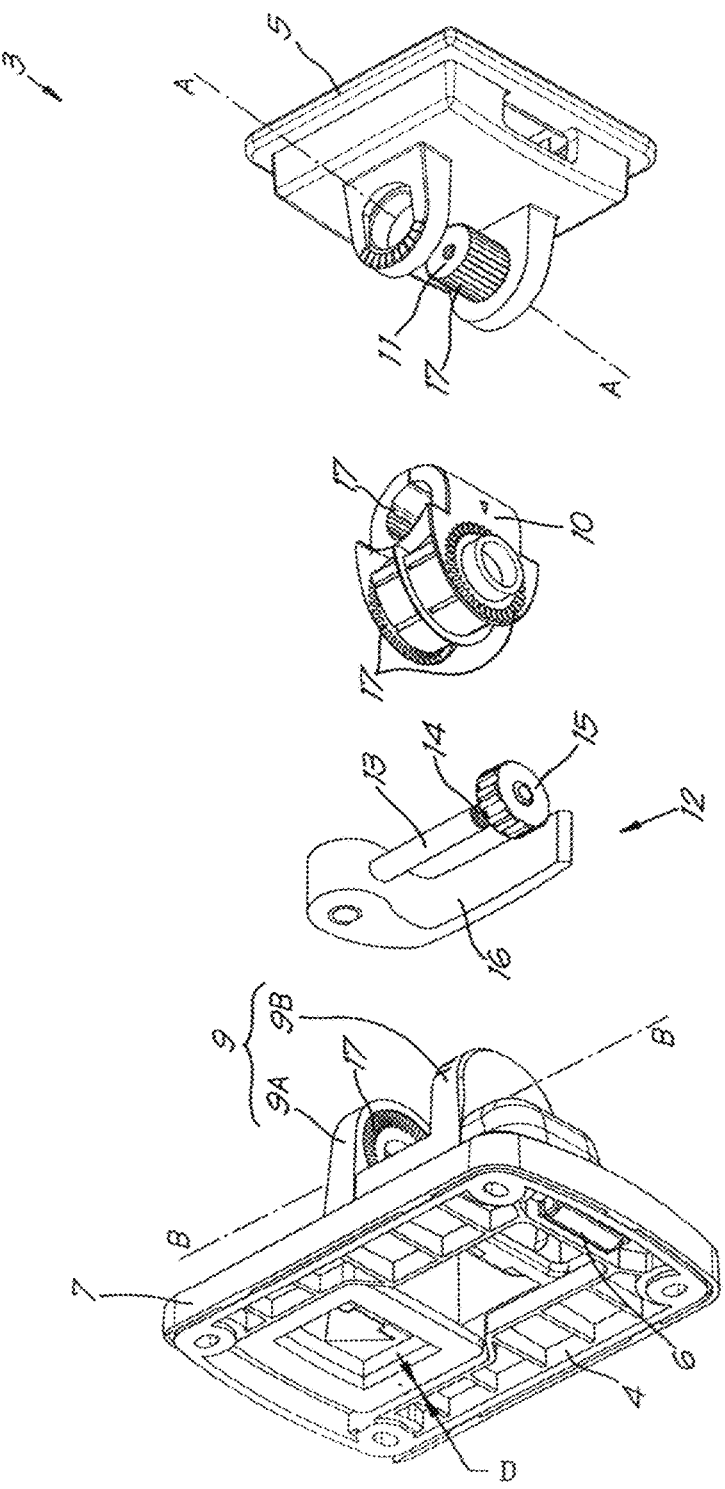
FIG. 7 shows a perspective view of the part of FIGS. 3 and 6 and subdivided into further components.

As shown in FIG. 7, this hinge 8 is formed by a claw 9 in two parts 9A and 9B, one of the two of which 9A is movably fastened at the base 4, in which a fastening element 10 is suspended, and a physical hinge pin 11 that is fastened to the first mechanical coupling device 5, whereby the connecting element 10 is mounted around this physical hinge pin 11.

As a result the first mechanical coupling device 5 can hinge around the connecting element 10 with its physical hinge pin 11. The physical hinge pin 11 thereby forms a first geometric hinge axis A. The connecting element 10 can also hinge with respect to the base 4, around a second hinge axis B.

The part 9A of the claw 9 runs to the rear of the base 4, only up to a certain distance D from the rear plane, so that it can move without being obstructed by a wall against which the base 4 is fastened.

The suspension bracket 3 is further provided with a clamp 12 that comprises a tightening shaft 13 that is provided at an end with a screw thread 14 on which an end stop 15 is screwed, and which comprises a foldable handle 16 with which the tightening shaft 13 can be tightened.

The end stop 15 is held so that it cannot move without the use of specific tools on the screw thread 14. As a result the effective length of the tightening shaft 13 remains constant, and as a result also the necessary tightening force.

At the locations where the various components of the hinge 8, hingeable with respect to one another, can move alongside one another are constructed with ribs 17.

In the surface of the first mechanical coupling device 5 turned away from the base 4, click-in terminals 18 are affixed for electrical wires for an audio source signal, indicated by + and − in the drawings.

Furthermore, three sets 19A, 19B, 19C of each two first electrical contact points 19 are affixed in corresponding holes 20 in that surface, whereby the first electrical contact points 19 are electrically connected in pairs to the terminals 18, internally in the first mechanical coupling device 5.

The loudspeaker housing 2 is provided on its rear with a second mechanical coupling device that essentially consists of a cutaway 21 in the rear wall of the loudspeaker housing 2, with a shape and size that correspond to the first mechanical coupling device 5, whereby there is an undercut section 22 below the top edge of the cutaway 21.

Furthermore the second mechanical coupling device comprises a latch 23 on the rear of the loudspeaker housing 2, whereby the latch is provided with a compression spring 24, whereby the latch 23 is partially in front of the cutaway 21. The latch 23 is provided with a bevelled section 25.

In a deepened part 26 in the cutaway 21 there is an adjustment button 27 in order to adjust the power of the loudspeaker housing 2.

Furthermore, in the cutaway 21 there are two second electrical contact points that are constructed as protruding copper pins 28. The shape and position of them correspond to the shape and position of each of the three sets 19A, 19B, 19C of the first electrical contact points 19. The second electrical contact points 28 are electrically connected to loudspeakers in the loudspeaker housing 2.

The use of the combination 1 is simple and as follows. It is hereby assumed that at this position all electrical wires are present for an electrical source signal for audio.

First the suspension bracket 3 is fastened to a wall at the desired place. To this end the cover 7 is temporarily detached from the rest of the base so that the spirit level can be seen, and the base 4 can be positioned in a horizontal orientation using the spirit level 6, after which the cover 7 is put back.

Now the first geometric hinge axis A is in a horizontal orientation and the second geometric hinge axis B is in a vertical orientation.

Then the electric wires are connected to the terminals 18, so that each of the sets 19A, 19B, 19C of first electrical contacts 19 are supplied by the said source signal.

Then the desired setting is selected using the adjustment button 27.

Figure 8:
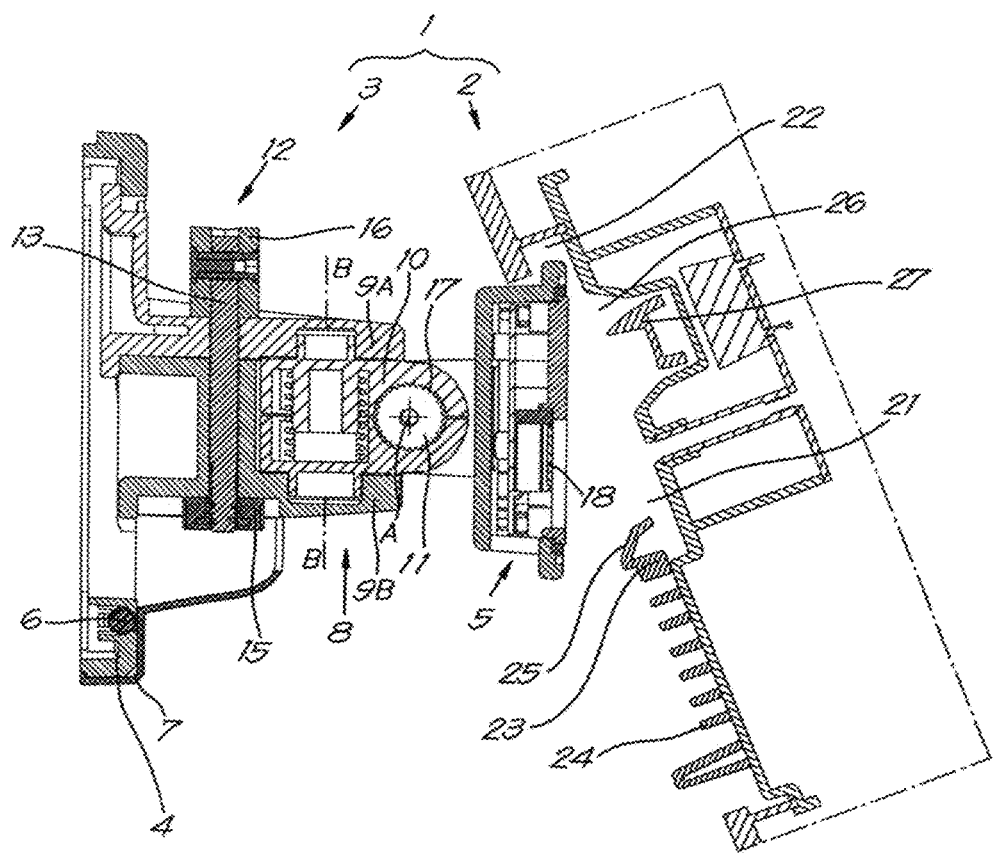
FIG. 8 shows a step in the use of the combination of FIG. 1 in a vertical cross-section as indicated by VII-VII in FIG. 2.

Now the loudspeaker housing 2 is mechanically coupled to the suspension bracket 3. As shown in FIG. 8, this is done by placing the cutaway 21 over the first mechanical coupling device 5, whereby the top edge of the first mechanical coupling device 5 is placed in the undercut section 22 of the cutaway 21.

Figure 9:
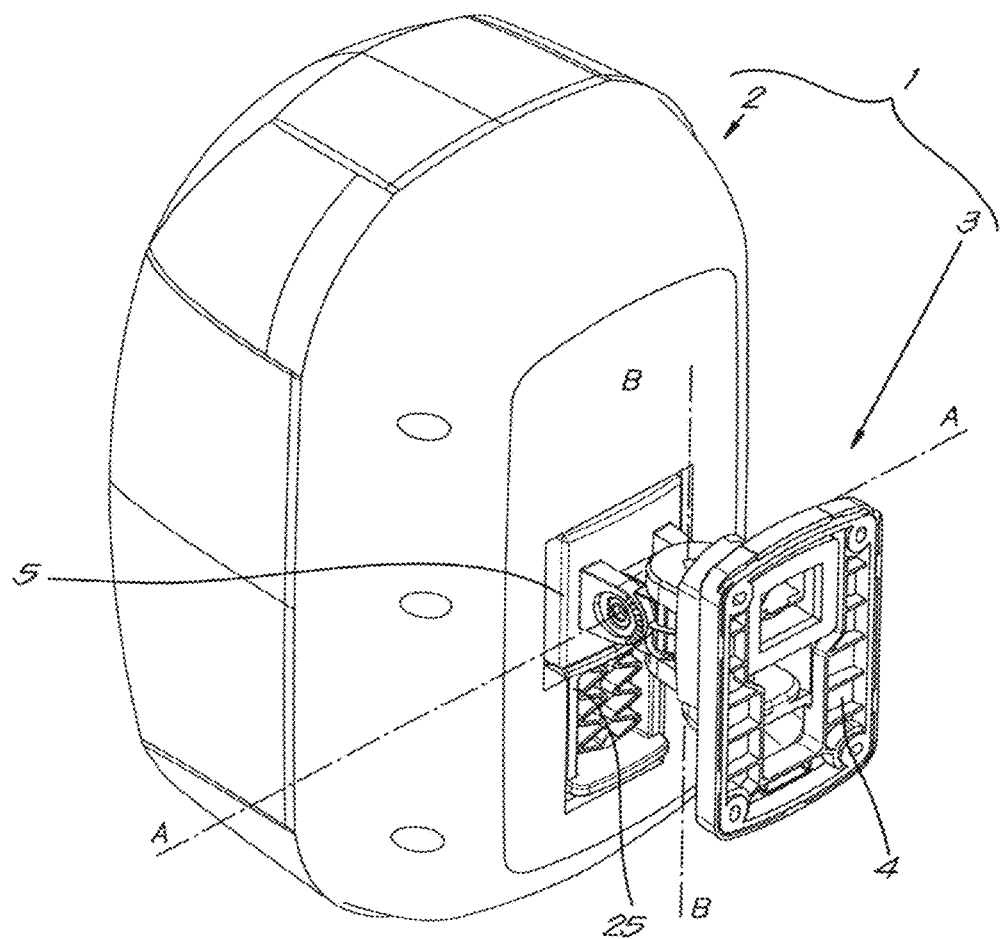
FIG. 9 shows a perspective view of a next step in the use of the combination of FIG. 1.

The loudspeaker housing 2 is now pushed straight by the installer until the first mechanical coupling device 5 pushes against the bevelled part 25 of the latch 23. As a result the latch 23 is pushed in against the pressure of the spring 24, after which the entire first mechanical coupling device 5 is pushed in the cutaway 21 by the installer, after which the latch 23 moves back under the pressure of the spring 24 in order to complete the mechanical coupling of the loudspeaker housing 2 and the suspension bracket 3, as shown in FIG. 9.

During the above operations the pins 28 slide in the holes 20 and thereby come into contact with the first electrical contact points 19, in this case more specifically with the set 19B, such that the necessary electrical connection between the electric wires carrying the audio source signal and the loudspeakers in the loudspeaker housing 2 is brought about.

The adjustment button 27 is no longer accessible as a result, because it is covered by the first mechanical coupling device 5.

The desired orientation of the loudspeaker housing 2 can now be adjusted by loosening the clamp 12 by tilting the handle 16, placing the loudspeaker housing 2 in the desired orientation and tightening the clamp 12 again.

This has the result that the part 9A of the claw 9 moves towards the part 9B so that the part 9A pushes against the connecting element 10, such that the orientation of the connecting element 10 is fastened with respect to the base 4.

At the same time the connecting element 10 is compressed so that it clamps around the physical hinge pin 11, so that the orientation of the first mechanical coupling device 5 is fastened with respect to the connecting element 10.

The ribs 17 on the various components hereby help to maintain the set positions with a relatively limited tightening force.

The tightening shaft 13 can be turned in the base 4 to use the clamp 12 both from the left and the right, depending on the preference of the installer and the available space.

The mechanical and electrical coupling is again removed by moving the latch 23 away and simply taking the loudspeaker housing 2 off the suspension bracket 3.

Alternatively in the above-mentioned position, whereby the longitudinal axis of the loudspeaker housing 2 is parallel to the second hinge axis B, the loudspeaker housing can also be turned over 90° in both directions so that its longitudinal axis is parallel to the first geometric hinge axis A.

The only difference is that in this orientation the second electrical contact points 19 are slid into different holes during the mechanical coupling, and thus come into electrical contact with another set 19A, 19C of the first electrical contact points 19.

The present invention is by no means limited to the embodiment described as an example and shown in the drawings, but a combination according to the invention can be realised in all kinds of forms and dimensions, without departing from the scope of the invention.

The invention claimed is:

1. A combination (1) of a loudspeaker housing (2) and a suspension bracket (3) for hanging the loudspeaker housing (2) to a fixed suspension point,
   wherein the suspension bracket (3) includes a first mechanical coupling device (5 and the loudspeaker housing (2) includes a second mechanical coupling device (21), whereby the first mechanical coupling device (5) is complementary to the second mechanical coupling device (21), the suspension bracket (3) having at least two first electrical contact points (19) at a fixed position and in a fixed orientation with respect to the first mechanical coupling device (5), the loudspeaker housing (2) including at least two second electrical contact points (28) that are located at a fixed position and in a fixed orientation with respect to the second mechanical coupling device (21), whereby the first electrical contact points (19) are complementary to the second electrical contact points (28), and whereby the first and second electrical contact points (19, 28) are arranged to make contact with one another in the situation in which the loudspeaker housing (2) and the suspension bracket (3) are mechanically coupled by means of the mechanical coupling devices (5, 21), wherein the suspension bracket (3) also includes a base (4) for fastening the suspension bracket (3) to a fixed suspension point, and a hinge (8) configured for adjusting an orientation of the first mechanical coupling device (5) with respect to the base (4), whereby the hinge (10) has a connecting element, and two geometric hinge axes including a first geometric hinge axis (A) and a second geometric hinge axis (B) perpendicular to the first geometric hinge axis (A), the connecting element (10) of the hinge being turnable about both the first and second geometric hinge axes (A, B) and deformable, the connecting element (10) suspended in a tightenable claw (9) at the base (4), and the connecting element (10) mounted around a physical shaft (11) that forms part of the first mechanical coupling device (5), whereby the tightenable claw (9) is tightenable against the connecting element (10) by means of a clamp (12) with a tightening shaft (13) to thereby block a movement of the tightenable claw (9) with respect to the connecting element (10) and to thereby deform the connecting element (10) so that the connecting element (10) pushes against the physical shaft (11) to thereby block a movement of the said physical shaft (11) with respect to the connecting element (10), and whereby the tightening shaft (13) is freely turnable.

2. The combination according to claim 1, wherein one of the mechanical coupling devices is a sheet-form coupling device (5) and the other mechanical coupling device comprises a cutaway (21) with an undercut part (22), whereby the sheet-form coupling device (5) fits in the cutaway (21) and at least partially fits in the undercut part (22).

3. The combination according to claim 2, wherein the loudspeaker housing (2) is provided with an adjustment button (27) that is located in the cutaway (21) so that the adjustment button (27) is accessible when the loudspeaker housing (2) and the suspension bracket (3) are not coupled, and is not accessible when the loudspeaker housing (2) and the suspension bracket (3) are mechanically coupled.

4. The combination according to claim 2, wherein at least one of the mechanical coupling devices (5, 21) comprises a latch (23) that is held in an extended position by means of a spring (24), whereby the latch (23) is placed such that, in a situation in which the loudspeaker housing (2) and the suspension bracket (3) are mechanically coupled, it blocks the mechanical coupling devices (5, 21) with respect to one another.

5. The combination according to claim 2, wherein the mechanical coupling devices (5,21) are arranged such that the loudspeaker housing (2) and the suspension bracket (3) can be mechanically coupled with respect to one another in two or more different orientations.

6. The combination according to claim 1, wherein at least one of the mechanical coupling devices (5, 21) comprises a latch (23) that is held in an extended position by means of a spring (24), whereby the latch (23) is placed such that, in a situation in which the loudspeaker housing (2) and the suspension bracket (3) are mechanically coupled, it blocks the mechanical coupling devices (5, 21) with respect to one another.

7. The combination according to claim 6, wherein the mechanical coupling devices (5,21) are arranged such that the loudspeaker housing (2) and the suspension bracket (3) can be mechanically coupled with respect to one another in two or more different orientations.

8. The combination according to claim 6, wherein the loudspeaker housing (2) is provided with an adjustment button (27) that is located in the cutaway (21) so that the adjustment button (27) is accessible when the loudspeaker housing (2) and the suspension bracket (3) are not coupled, and is not accessible when the loudspeaker housing (2) and the suspension bracket (3) are mechanically coupled.

9. The combination according to claim 1, wherein the mechanical coupling devices (5,21) are arranged such that the loudspeaker housing (2) and the suspension bracket (3) can be mechanically coupled with respect to one another in two or more different orientations.

10. The combination according to claim 9, wherein the mechanical coupling devices (5,21) are one of square shaped and square with bevelled or rounded corners.

11. The combination according to claim 1, wherein the first or second electrical contact points are formed by electrically conductive pins (28), whereby the other electrical contact points (19) are sunk in holes (20) to receive the pins (28).

12. The combination according to claim 11, wherein there are at least two sets (19A, 19B, 19C) of two electrical contact points (19) of the electrical contact points (19) that are sunk in the said holes (20), whereby each set (19A, 19B, 19C) is separately arranged to make contact with the other electrical contact points (28), in a situation in which the loudspeaker housing (2) and the suspension bracket (3) are mechanically coupled, whereby a first set (19A, 19B, 19C) of the at least two sets (19A, 19B, 19C) is arranged to make contact with the other electrical contact points (28) in a first orientation of the loudspeaker housing (2) and a second set (19A, 19B, 19C) of the at least two sets (19A, 19B, 19C) is arranged to make contact with the other electrical contact points (28) in a second orientation of the loudspeaker housing (2).

13. The combination according to claim 1, wherein the second electrical contact points are formed by protruding electrically conductive pins (28), whereby the first electrical contact points (19) are in holes (20) in the first coupling device (5).

14. The combination according to claim 1, wherein the suspension bracket (5) is provided with a spirit level (6).

15. The combination according to claim 1, wherein the suspension bracket (3) is suspended at a fixed suspension point, whereby one of the said geometric hinge axes (B) is vertical and whereby this geometric hinge axis (B) is closer to the suspension point than the other hinge axis (A).

* * * * *